(12) United States Patent
Yashiro et al.

(10) Patent No.: US 10,760,478 B2
(45) Date of Patent: Sep. 1, 2020

(54) MULTI-STAGE TURBO SUPERCHARGING SYSTEM

(71) Applicant: MITSUBISHI HEAVY INDUSTRIES ENGINE & TURBOCHARGER, LTD., Sagamihara-shi, Kanagawa (JP)

(72) Inventors: Yusuke Yashiro, Tokyo (JP); Vissuta Jiwariyavej, Tokyo (JP); Yoshihiro Hayashi, Tokyo (JP); Byeongil An, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 10 days.

(21) Appl. No.: 16/094,445

(22) PCT Filed: May 18, 2016

(86) PCT No.: PCT/JP2016/064720
§ 371 (c)(1),
(2) Date: Oct. 17, 2018

(87) PCT Pub. No.: WO2017/199363
PCT Pub. Date: Nov. 23, 2017

(65) Prior Publication Data
US 2019/0120127 A1    Apr. 25, 2019

(51) Int. Cl.
*F02B 37/16*    (2006.01)
*F02M 26/08*    (2016.01)
(Continued)

(52) U.S. Cl.
CPC .............. *F02B 37/16* (2013.01); *F02B 37/00* (2013.01); *F02B 37/013* (2013.01);
(Continued)

(58) Field of Classification Search
CPC ........ F02B 37/00; F02B 37/013; F02B 37/16; F02B 37/162; F02B 37/18; F02B 37/24;
(Continued)

(56) References Cited

U.S. PATENT DOCUMENTS

| | | |
|---|---|---|
| 6,378,308 B1 | 4/2002 | Pflüger |
| 7,000,393 B1 | 2/2006 | Wood et al. |

(Continued)

FOREIGN PATENT DOCUMENTS

| | | |
|---|---|---|
| EP | 1936147 A2 | 6/2008 |
| JP | 6-219188 A | 8/1994 |

(Continued)

OTHER PUBLICATIONS

JP2005180404 translation, Isotani Tomoyuki, Publication date: Jul. 7, 2005.*

(Continued)

*Primary Examiner* — Jesse S Bogue
(74) *Attorney, Agent, or Firm* — Birch, Stewart, Kolasch & Birch, LLP (57) ABSTRACT

A multi-stage turbo supercharging system includes: a bypass passage which bypasses a turbocharger from among a plurality of turbochargers, in an intake passage or an exhaust passage of the engine; a bypass valve disposed in the bypass passage; an operation mode selection part; a bypass valve opening degree map selection part configured to select at least one bypass valve opening degree map in accordance with the operation mode selected by the operation mode selection part, from among a plurality of bypass valve opening degree maps which represent respective relationships between a plurality of control parameters of the engine and an opening degree of the bypass valve; a bypass valve opening degree determination part configured to determine an opening degree command value for the bypass valve on (Continued)

the basis of the bypass valve opening degree map and control parameter information representing the plurality of control parameters; and a bypass valve opening degree control part configured to control the opening degree of the bypass valve on the basis of the opening degree command value for the bypass valve.

9 Claims, 8 Drawing Sheets

(51) Int. Cl.
*F02B 37/013* (2006.01)
*F02B 37/00* (2006.01)
*F02B 37/18* (2006.01)
*F02B 37/24* (2006.01)
*F02D 41/00* (2006.01)
*F02M 25/06* (2016.01)
*F02B 37/12* (2006.01)

(52) U.S. Cl.
CPC ............ *F02B 37/162* (2019.05); *F02B 37/18* (2013.01); *F02B 37/24* (2013.01); *F02D 41/0007* (2013.01); *F02D 41/0047* (2013.01); *F02D 41/0065* (2013.01); *F02D 41/0072* (2013.01); *F02M 25/06* (2013.01); *F02M 26/08* (2016.02); *F02B 2037/122* (2013.01); *Y02T 10/144* (2013.01)

(58) Field of Classification Search
CPC ........... F02B 2037/122; F02D 41/0007; F02D 41/0047; F02D 41/0065; F02D 41/0072; F02M 25/06; F02M 26/08; Y02T 10/144
See application file for complete search history.

(56) References Cited

U.S. PATENT DOCUMENTS

| | | | |
|---|---|---|---|
| 8,635,869 B2 | 1/2014 | An et al. | |
| 9,422,896 B2* | 8/2016 | Parikh | .................... F02M 26/49 |
| 9,822,694 B2* | 11/2017 | Mischler | ............. F02D 41/0007 |
| 2014/0214302 A1* | 7/2014 | Parikh | ................... F02D 41/005 |
| | | | 701/101 |

FOREIGN PATENT DOCUMENTS

| | | |
|---|---|---|
| JP | 8-182382 A | 7/1996 |
| JP | 2000-170580 A | 6/2000 |
| JP | 2002-512337 A | 4/2002 |
| JP | 2005-180404 A | 7/2005 |
| JP | 2005-330811 A | 12/2005 |
| JP | 2007-56843 A | 3/2007 |
| JP | 2007-315217 A | 12/2007 |
| JP | 2008-536055 A | 9/2008 |
| JP | 2010-163915 A | 7/2010 |
| JP | 2012-127205 A | 7/2012 |
| JP | 2014-169648 A | 9/2014 |
| JP | 2016-3614 A | 1/2016 |
| WO | WO 99/54607 A1 | 10/1999 |
| WO | WO 2010/128227 A1 | 11/2010 |

OTHER PUBLICATIONS

JP2005330811 Translation, Fujiwara Kiyoshi, Publication date: Dec. 2, 2005.*
JP2007056843 Translation, Eiraku Rei, Publication date: Mar. 8, 2007.*
JP2007315217 Translation, Isobe Taiji,Publication date: Dec. 6, 2007.*
JP2010163915_Translation , Kagata Noboru,Publication date: Jul. 29, 2010.*
JP2012127205A_Translation, Hotta Kazuro, Publication Jul. 5, 2012.*
JP2014169648_Translation, Azuma Kunihiko, Sep. 18, 2014.*
Extended European Search Report for corresponding European Application No. 16902382.7, dated Mar. 6, 2019.
Office Action dated Sep. 19, 2019 issued in the corresponding European Application No. 16902382.7.
2nd Office Action dated Jun. 11, 2019 in the corresponding Japanese Application No. 2018-517993 with an English Translation.
Office Action dated Feb. 12, 2019 in the corresponding Japanese Application No. 2018-517993 with an English Translation.
International Preliminary Report on Patentability and Written Opinion of the International Searching Authority (Forms PCT/IB/338, PCT/IB/373, PCT/ISA/237, and PCT/IB/326) for corresponding International Application No. PCT/JP2016/064720 dated Nov. 29, 2018, with English Translation.
International Search Report (forms PCT/ISA/210 and PCT/ISA/220) for International Application No. PCT/JP2016/064720, dated Jul. 26, 2016.
Office Action dated Mar. 23, 2020 issued in counterpart Chinese Application No. 201680085291.6 with an English Translation.

* cited by examiner

MULTI-STAGE TURBO SUPERCHARGING SYSTEM

TECHNICAL FIELD

The present disclosure relates to a multi-stage turbo supercharging system.

BACKGROUND ART

A turbocharger is configured to rotary-drive a turbine with exhaust gas of an engine, compress air through rotation of a compressor provided coaxially with the turbine, and supply the compressed air to the engine, and is capable of increasing the output of the engine or reduce the fuel consumption amount at the same output.

The work of the turbocharger depends on energy that the turbine receives from exhaust gas. Thus, in an engine low rotation speed region where the amount of exhaust gas is small, the supercharging effect is low.

As one of the configurations capable of solving the above problem, a multi-stage turbo supercharging system with a plurality of turbochargers is known. For instance, a two-stage turbocharger including combination of a larger turbocharger and a smaller turbocharger has been commercialized.

A two-stage turbocharger may include two larger and smaller turbochargers, a bypass passage that bypasses the smaller turbocharger, and a bypass valve disposed in the bypass passage.

With this configuration, when the engine is operating at a low rotation speed and a low load and the flow rate of exhaust gas is low, both of the bypass valves on the turbine side and the compressor side close and exhaust gas is fed to the smaller turbocharger, which makes it possible to perform efficient supercharging with a small flow rate of exhaust gas. On the other hand, when the engine is operating at a high rotation speed and the flow rate of exhaust gas is sufficient, both of the bypass valves on the turbine side and the compressor side open and exhaust gas is fed to the larger turbocharger bypassing the smaller turbocharger, which makes it possible to address a high flow rate of exhaust gas.

Patent Document 1 discloses a multi-stage turbo supercharging system including a high-pressure stage with a smaller rotor diameter, a low-pressure stage with a larger rotor diameter, and a bypass passage that bypasses the turbine of the high-pressure stage in the exhaust passage of the engine.

Patent Document 2 discloses a multi-stage turbo supercharging system including a high-pressure stage with a smaller rotor diameter, a low-pressure stage with a larger rotor diameter, a bypass passage that bypasses the turbine of the high-pressure stage in the exhaust passage of the engine, and a bypass passage that bypasses the turbine of the low-pressure stage in the exhaust passage of the engine.

CITATION LIST

Patent Literature

Patent Document 1: JP2002-512337A (translation of a PCT application)
Patent Document 2: U.S. Pat. No. 8,635,869B

SUMMARY

Problems to be Solved

Meanwhile, in Patent Document 1 and Patent Document 2, to improve the supercharging performance, the bypass valve is controlled on the basis of the pressure measurement result of a pressure sensor disposed in the multi-stage supercharging system.

With this configuration, improving the performance of the pressure sensor to achieve a desired supercharging performance may lead to cost increase due to complex configuration of the sensor.

The present invention was made in view of the above described typical problem, and an object of the present invention is to provide a multi-stage turbo supercharging system capable of achieving a desired supercharging performance with a simplified configuration, a control device for the same, and an operation control program for the same.

Solution to the Problems (1) A multi-stage turbo supercharging system according to at least one embodiment of the present invention includes a plurality of turbochargers to be driven by exhaust gas of an engine, and further includes: a bypass passage which bypasses a turbocharger from among the plurality of turbochargers, in an intake passage or an exhaust passage of the engine; a bypass valve disposed in the bypass passage; an operation mode selection part configured to select an operation mode from among a plurality of operation modes of the engine; a bypass valve opening degree map selection part configured to select at least one bypass valve opening degree map in accordance with the operation mode selected by the operation mode selection part, from among a plurality of bypass valve opening degree maps which represent respective relationships between a plurality of control parameters of the engine and an opening degree of the bypass valve; a bypass valve opening degree determination part configured to determine an opening degree command value for the bypass valve on the basis of the bypass valve opening degree map selected by the bypass valve opening degree map selection part and control parameter information representing the plurality of control parameters; and a bypass valve opening degree control part configured to control the opening degree of the bypass valve on the basis of the opening degree command value for the bypass valve determined by the bypass valve opening degree determination part.

With the above multi-stage turbo supercharging system (1), by preparing in advance the bypass valve opening degree map representing relationships between a plurality of control parameters at each operation point of the engine (e.g., the rotation speed and the target torque of the engine) and the opening degree of the bypass valve for achieving a desired supercharging performance on the basis of simulation or engine tests, for instance, it is possible to achieve a desired supercharging performance suitable for an operation mode, by selecting, a bypass valve opening degree map suitable for the operation mode.

Furthermore, it is possible to achieve the above desired supercharging performance with a simplified configuration, by preparing the bypass valve opening degree map and determining the bypass valve opening degree with the bypass valve opening degree determination part by using the control parameters that are normally measured from the engine (e.g., the rotation speed and the target torque of the engine). For instance, it is possible to achieve a desired supercharging performance without providing a pressure sensor, unlike Patent Documents 1 and 2, and it is possible to reduce the cost and avoid the risk of failure of a pressure sensor. Alternatively, by providing a pressure sensor in the intake passage or the exhaust passage to take into account the measurement result of the pressure sensor when determining the opening degree of the bypass valve, it is possible to achieve a desired supercharging performance with a pressure sensor that is simpler than those in Patent Documents 1 and 2, or to achieve a higher supercharging performance with a pressure sensor of an equivalent performance compared to those in Patent Documents 1 and 2.

(2) In some embodiments, the multi-stage turbo supercharging system includes: an EGR passage which brings the exhaust passage and the intake passage into communication; and an EGR valve disposed in the EGR passage. The plurality of operation modes include: a low EGR operation mode; and a high EGR operation mode in which an EGR rate representing a ratio of a recirculation flow rate of the exhaust gas to the intake passage via the EGR passage to an intake amount of the engine is greater than that in the low EGR operation mode. The plurality of bypass valve opening degree maps include a low EGR map corresponding to the low EGR operation mode and a high EGR map corresponding to the high EGR operation mode. The bypass valve opening degree map selection part is configured to select the low EGR map from the plurality of bypass valve opening degree maps if the low EGR operation mode is selected by the operation mode selection part and select the high EGR map from the plurality of bypass valve opening degree maps if the high EGR operation mode is selected by the operation mode selection part.

With the above multi-stage turbo supercharging system (2), it is possible to reduce the combustion temperature of the engine by recirculating a part of exhaust gas of the engine to the intake passage via the EGR passage to reduce the oxygen concentration of the intake gas of the engine, thereby suppressing generation of NOx.

Furthermore, the bypass valve opening degree map selection part selects a bypass valve opening degree map suitable for a low EGR rate if the low EGR operation mode is selected, and selects a bypass opening degree map suitable for a high EGR rate if the high EGR operation mode is selected. Accordingly, even if the EGR rate changes, it is possible to achieve a desired supercharging performance with a simple configuration.

(3) In some embodiments, the multi-stage turbo supercharging system according to the above (1) or (2) further includes an EGR passage which brings the exhaust passage and the intake passage into communication; and an EGR valve disposed in the EGR passage. The plurality of operation modes include an exhaust gas purification mode which prioritizes purification of the exhaust gas. The plurality of bypass valve opening degree maps include an EGR priority map which prioritizes an EGR rate representing a ratio of a recirculation flow rate of the exhaust gas to the intake passage via the EGR passage to an intake amount of the engine. The bypass valve opening degree map selection part is configured to select the EGR priority map from among the plurality of bypass valve opening degree maps if the exhaust gas purification mode is selected by the operation mode selection part.

With the above multi-stage turbo supercharging system (3), if the exhaust gas purification mode in which purification of exhaust gas is prioritized is selected, the opening degree of the bypass valve is controlled by using the EGR priority map in which the EGR rate is prioritized, and thus it is possible to suppress generation of NOx and achieve a desired supercharging performance.

(4) In some embodiments, in the multi-stage turbo supercharging system according to any one of the above (1) to (3), the plurality of operation modes include an eco operation mode and an acceleration focused mode. The plurality of bypass valve opening degree maps include a fuel consumption priority map which prioritizes fuel consumption of the engine, and an output priority map which prioritizes an output of the engine. The bypass valve opening degree map selection part is configured to select the fuel consumption priority map from the plurality of bypass valve opening degree maps if the eco operation mode is selected by the operation mode selection part and select the output priority map from the plurality of bypass valve opening degree maps if the acceleration focused mode is obtained by the operation mode selection part.

With the above multi-stage turbo supercharging system (4), if the eco operation mode is selected, the opening degree of the bypass valve is controlled by using the fuel consumption priority map in which fuel consumption of the engine is prioritized, and thus it is possible to achieve a desired supercharging performance with a prioritized fuel consumption of the engine. Furthermore, if the acceleration focused mode is selected, the opening degree of the bypass valve is controlled by using the output priority map in which the output of the engine is prioritized, and thus it is possible to achieve a desired supercharging performance with a prioritized output of the engine.

(5) In some embodiments, the multi-stage turbo supercharging system according to any one of the above (1) to (4) further includes: an EGR passage which brings the exhaust passage and the intake passage into communication; an EGR valve disposed in the EGR passage; an EGR rate sensor for measuring an EGR rate representing a ratio of a recirculation flow rate of the exhaust gas to the intake passage via the EGR passage to an intake amount of the engine; an EGR rate map selection part configured to select at least one EGR rate map in accordance with the operation mode selected by the operation mode selection part from among a plurality of EGR rate maps representing respective relationships between the plurality of control parameters of the engine and a target EGR rate; an EGR rate determination part configured to determine the target EGR rate on the basis of the EGR rate map selected by the EGR rate map selection part and control parameter information representing the plurality of control parameters; an EGR valve opening degree determination part configured to determine an opening degree command value for the EGR valve on the basis of the EGR rate measured by the EGR rate sensor and the target EGR rate determined by the EGR rate determination part; and an EGR valve opening degree control part configured to control an opening degree of the EGR valve on the basis of the opening degree command value for the EGR valve determined by the EGR valve opening degree determination part.

With the above multi-stage turbo supercharging system (5), by preparing in advance the EGR rate map representing relationships between a plurality of control parameters at each operation point of the engine (e.g., the rotation speed and the target torque of the engine) and the target EGR rate for achieving a desired supercharging performance on the basis of simulation or engine tests, for instance, it is possible to achieve a desired supercharging performance suitable for an operation mode, by selecting an EGR valve opening degree map suitable for the operation mode.

Furthermore, it is possible to achieve the above desired supercharging performance with a simplified configuration, by preparing the EGR valve opening degree map and determining the EGR valve opening degree with the EGR valve opening degree determination part by using the control parameters that are normally measured from the engine (e.g., the rotation speed and the target torque of the engine) as the plurality of parameters.

(6) In some embodiments, in the multi-stage turbo supercharging system according to any one of the above (1) to (5), the engine is an engine for an automobile, the plurality of control parameters include a target torque of the engine, and the multi-stage turbo supercharging system includes a target torque determination part configured to determine the target torque on the basis of an accelerator operation amount by a driver.

With the above multi-stage turbo supercharging system (6), the opening degree of the bypass valve is controlled on the basis of the target torque determined on the basis of the accelerator operation amount by the driver, and thereby it is possible to achieve a desired supercharging performance reflecting the intention of the driver with a simple configuration.

(7) In some embodiments, the multi-stage turbo supercharging system according to any one of the above (1) to (6) further includes a rotation sensor configured to measure a rotation speed of a turbocharger bypassed by the bypass passage, of the plurality of turbochargers. The bypass valve opening degree control part is configured to control the bypass valve so that the opening degree of the bypass valve becomes greater than the opening degree command value for the bypass valve obtained from the bypass valve opening degree map selected by the bypass valve opening degree map selection part, if the rotation speed of the turbocharger measured by the rotation sensor exceeds a threshold.

With the multi-stage turbo supercharging system according to the above (1) to (6), the opening degree of the bypass valve is controlled on the basis of the bypass valve opening degree map created on the basis of simulation or engine tests. Thus, if the conditions in the simulation or the engine tests are considerably different from actual operational conditions of the engine, the rotation speed of the turbocharger may exceed the design limit temporarily.

In this regard, with the above multi-stage turbo supercharging system (7), if the rotation speed of the turbocharger bypassed by the bypass passage exceeds the threshold, the bypass valve is controlled so that the opening degree of the bypass valve becomes greater than the opening degree command value for the bypass valve obtained from the bypass valve opening degree map, and thereby it is possible to suppress an excessive increase in the rotation speed of the turbocharger. Accordingly, it is possible to suppress breakage of the turbocharger.

(8) In some embodiments, in the turbocharger according to any one of the above (1) to (7), the plurality of turbochargers include a variable geometry turbocharger including a variable nozzle vane for adjusting a flow velocity of exhaust gas to a turbine blade. Further, the multi-stage turbo supercharging system includes: a nozzle vane opening degree map selection part configured to select at least one nozzle vane opening degree map in accordance with the operation mode selected by the operation mode selection part, from among a plurality of nozzle vane opening degree maps representing respective relationships between the plurality of control parameters of the engine and an opening degree of the variable nozzle vane: a nozzle vane opening degree determination part configured to determine an opening degree command value for the variable nozzle vane on the basis of the nozzle vane opening degree map selected by the nozzle vane opening degree map selection part and control parameter information representing the plurality of control parameters; and a nozzle vane opening degree control part configured to control the opening degree of the variable nozzle vane on the basis of the opening degree command value for the variable nozzle vane determined by the nozzle vane opening degree determination part.

With the above multi-stage turbo supercharging system (8), by preparing in advance the nozzle vane opening degree map representing relationships between a plurality of control parameters at each operation point of the engine (e.g., the rotation speed and the target torque of the engine) and the opening degree of the nozzle vane for achieving a desired supercharging performance on the basis of simulation or engine tests, for instance, it is possible to achieve a desired supercharging performance suitable for an operation mode, by selecting a nozzle vane opening degree map suitable for the operation mode.

Furthermore, it is possible to achieve the above desired supercharging performance with a simplified configuration, by preparing the nozzle vane opening degree map and determining the nozzle vane opening degree with the nozzle vane opening degree determination part by using the control parameters that are normally measured from the engine (e.g., the rotation speed and the target torque of the engine).

(9) A control device according to at least one embodiment of the present invention is for a multi-stage turbo supercharging system including: a plurality of turbochargers to be driven by exhaust gas of an engine; a bypass passage which bypasses a turbocharger from among the plurality of turbochargers, in an intake passage or an exhaust passage of the engine; and a bypass valve disposed in the bypass passage, and includes: an operation mode selection part configured to select an operation mode from among a plurality of operation modes of the engine; a bypass valve opening degree map selection part configured to select at least one bypass valve opening degree map in accordance with the operation mode selected by the operation mode selection part, from among a plurality of bypass valve opening degree maps which represent respective relationships between a plurality of control parameters of the engine and a rotation speed of the engine; a bypass valve opening degree determination part configured to determine an opening degree command value for the bypass valve on the basis of the bypass valve opening degree map selected by the bypass valve opening degree map selection part and control parameter information representing the plurality of control parameters; and a bypass valve opening degree control part configured to control the opening degree of the bypass valve on the basis of the opening degree command value for the bypass valve determined by the bypass valve opening degree determination part.

With the above controller for the multi-stage turbo supercharging system (9), by preparing in advance the bypass valve opening degree map representing relationships between a plurality of control parameters at each operation point of the engine (e.g., the rotation speed and the target torque of the engine) and the opening degree of the bypass valve for achieving a desired supercharging performance on the basis of simulation or engine tests, for instance, it is possible to achieve a desired supercharging performance suitable for an operation mode, by selecting a bypass valve opening degree map suitable for the operation mode.

Furthermore, it is possible to achieve the above desired supercharging performance with a simplified configuration, by preparing the bypass valve opening degree map and determining the bypass valve opening degree with the bypass valve opening degree determination part by using the control parameters that are normally measured from the engine (e.g., the rotation speed and the target torque of the engine). For instance, it is possible to achieve a desired supercharging performance without providing a pressure sensor, unlike Patent Documents 1 and 2, and it is possible to reduce the cost and avoid the risk of failure of a pressure sensor. Alternatively, by providing a pressure sensor in the intake passage or the exhaust passage to take into account the measurement result of the pressure sensor when determining the opening degree of the bypass valve, it is possible to achieve a desired supercharging performance with a pressure sensor that is simpler than those in Patent Documents 1 and 2, or to achieve a higher supercharging performance with a pressure sensor of an equivalent performance compared to those in Patent Documents 1 and 2.

(10) An operation control program according to at least one embodiment of the present invention is for a multi-stage turbo supercharging system including: a plurality of turbochargers to be driven by exhaust gas of an engine; a bypass passage which bypasses a turbocharger from among the plurality of turbochargers, in an intake passage or an exhaust passage of the engine; and a bypass valve disposed in the bypass passage, and includes: selecting an operation mode from among a plurality of operation modes of the engine; selecting at least one bypass valve opening degree map in accordance with the operation mode, from among a plurality of bypass valve opening degree maps which represent respective relationships between a plurality of control parameters of the engine and an opening degree of the bypass valve; determining an opening degree command value for the bypass valve on the basis of the bypass valve opening degree map and control parameter information representing the plurality of control parameters; and controlling the opening degree of the bypass valve on the basis of the opening degree command value for the bypass valve.

With the above operation control program for a multi-stage turbo supercharging system (10), by preparing in advance the bypass valve opening degree map representing relationships between a plurality of control parameters at each operation point of the engine (e.g., the rotation speed and the target torque of the engine) and the opening degree of the bypass valve for achieving a desired supercharging performance on the basis of simulation or engine tests, for instance, it is possible to achieve a desired supercharging performance suitable for an operation mode, by selecting a bypass valve opening degree map suitable for the operation mode.

Furthermore, it is possible to achieve the above desired supercharging performance with a simplified configuration, by preparing the bypass valve opening degree map and determining the bypass valve opening degree with the bypass valve opening degree determination part by using the control parameters that are normally measured from the engine (e.g., the rotation speed and the target torque of the engine). For instance, it is possible to achieve a desired supercharging performance without providing a pressure sensor unlike Patent Documents 1 and 2, and it is possible to reduce the cost and avoid the risk of failure of a pressure sensor. Alternatively, by providing a pressure sensor in the intake passage or the exhaust passage to take into account the measurement result of the pressure sensor when determining the opening degree of the bypass valve, it is possible to achieve a desired supercharging performance with a pressure sensor that is simpler than those in Patent Documents 1 and 2, or to achieve a higher supercharging performance with a pressure sensor of an equivalent performance compared to those in Patent Documents 1 and 2.

Advantageous Effects

According to at least one embodiment of the present invention, it is possible to provide a multi-stage turbo supercharging system capable of achieving a desired supercharging performance with a simplified configuration, a control device for the same, and an operation control program for the same.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
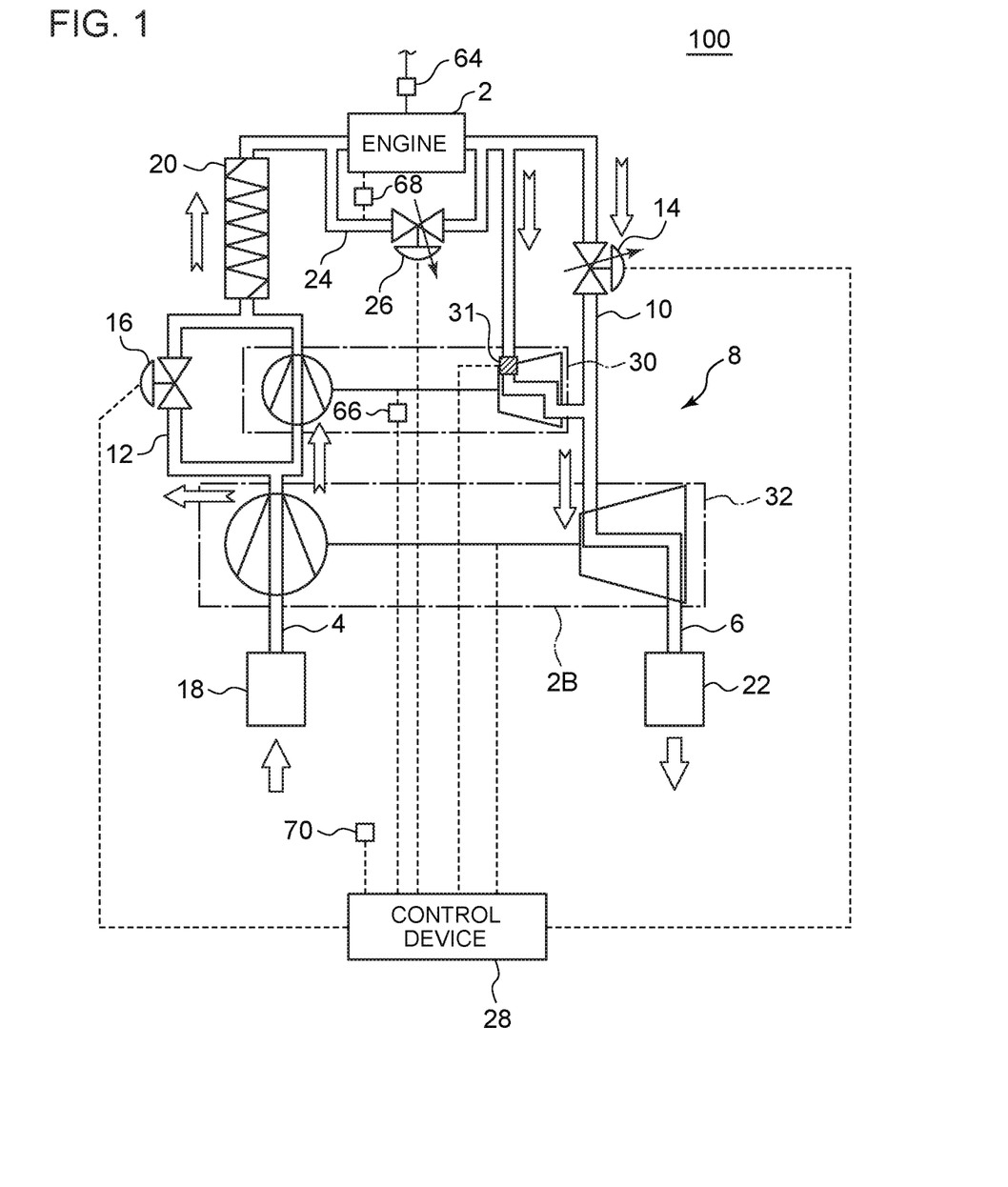
FIG. 1 is a schematic configuration diagram of a multi-stage supercharging system 100 according to an embodiment of the present invention.

FIG. 1 is a schematic configuration diagram of a multi-stage supercharging system 100 according to an embodiment of the present invention.

The multi-stage supercharging system 100 shown in FIG. 1 includes an engine 2, an intake passage 4, a plurality of turbochargers 8, a bypass passage 10, a bypass passage 12, a bypass valve 14, a bypass valve 16, an air cleaner 18, an inter cooler 20, a muffler 22, an EGR passage 24, an EGR valve 26, and a control device 28.

The engine 2 is a diesel engine for automobiles. The multi-stage supercharging system 100 is a two-stage turbo supercharging system including a small turbocharger 30 disposed in the high-pressure stage and a large turbocharger 32 that is larger than the small turbocharger 30 and is disposed in the low-pressure stage, which are the plurality of turbochargers driven by exhaust gas of the engine 2. The turbocharger 32 is disposed in series on the downstream side of the turbocharger 30 in the exhaust passage 6 of the engine 2. The turbocharger 30 is a variable geometry turbocharger having a variable nozzle vane 31 for adjusting the flow rate of the turbine side of the turbocharger 30.

The bypass passage 10 branches from between the turbine side of the turbocharger 30 and the engine 2 and connects to between the turbine side of the turbocharger 30 and the turbine side of the turbocharger 32, so as to bypass the turbine side of the turbocharger 30, in the exhaust passage 6.

The bypass passage 12 branches from between the compressor side of the turbocharger 30 and the compressor side of the turbocharger 32 and connects to between the compressor side of the turbocharger 30 and inter cooler 20, so as to bypass the compressor side of the turbocharger 30, in the intake passage 4.

The bypass valve 14 is disposed in the bypass passage 10. The bypass valve 14 is a flow-rate control valve configured such that the control device 28 is capable of controlling the opening degree of the bypass valve 14.

The bypass valve 16 is disposed in the bypass passage 12. The bypass valve 16 is a flow-rate control valve configured such that the control device 28 is capable of controlling the opening degree of the bypass valve 16.

The EGR passage 24 brings the intake passage 4 and the exhaust passage 6 into communication, and is configured to recirculate exhaust gas flowing through the exhaust passage 6 to the intake passage 4.

The EGR valve 26 is disposed in the EGR passage 24. The EGR valve 26 is a flow-rate control valve configured such that the control device 28 is capable of controlling the opening degree of the EGR valve 26.

Furthermore, in the embodiment shown in the drawing, the multi-stage supercharging system 100 includes an engine rotation sensor 64 for measuring the rotation speed of the engine 2, a turbocharger rotation sensor 66 for measuring the rotation speed of the turbocharger 30 bypassed to the bypass passage 10, an EGR rate sensor 68 for measuring an EGR rate which represents a ratio of the recirculation flow rate of exhaust gas to the intake passage 4 via the EGR passage 24 (flow rate of exhaust gas flowing through the EGR valve 26) to the intake amount of the engine, and an acceleration sensor 70 for measuring the acceleration operation amount by the driver of the automobile. The EGR rate sensor 68 is configured to measure the $CO_2$ concentration of the intake side of the engine 2 and the $CO_2$ concentration of the EGR passage 24, for instance, to estimate the EGR rate.

Figure 2:
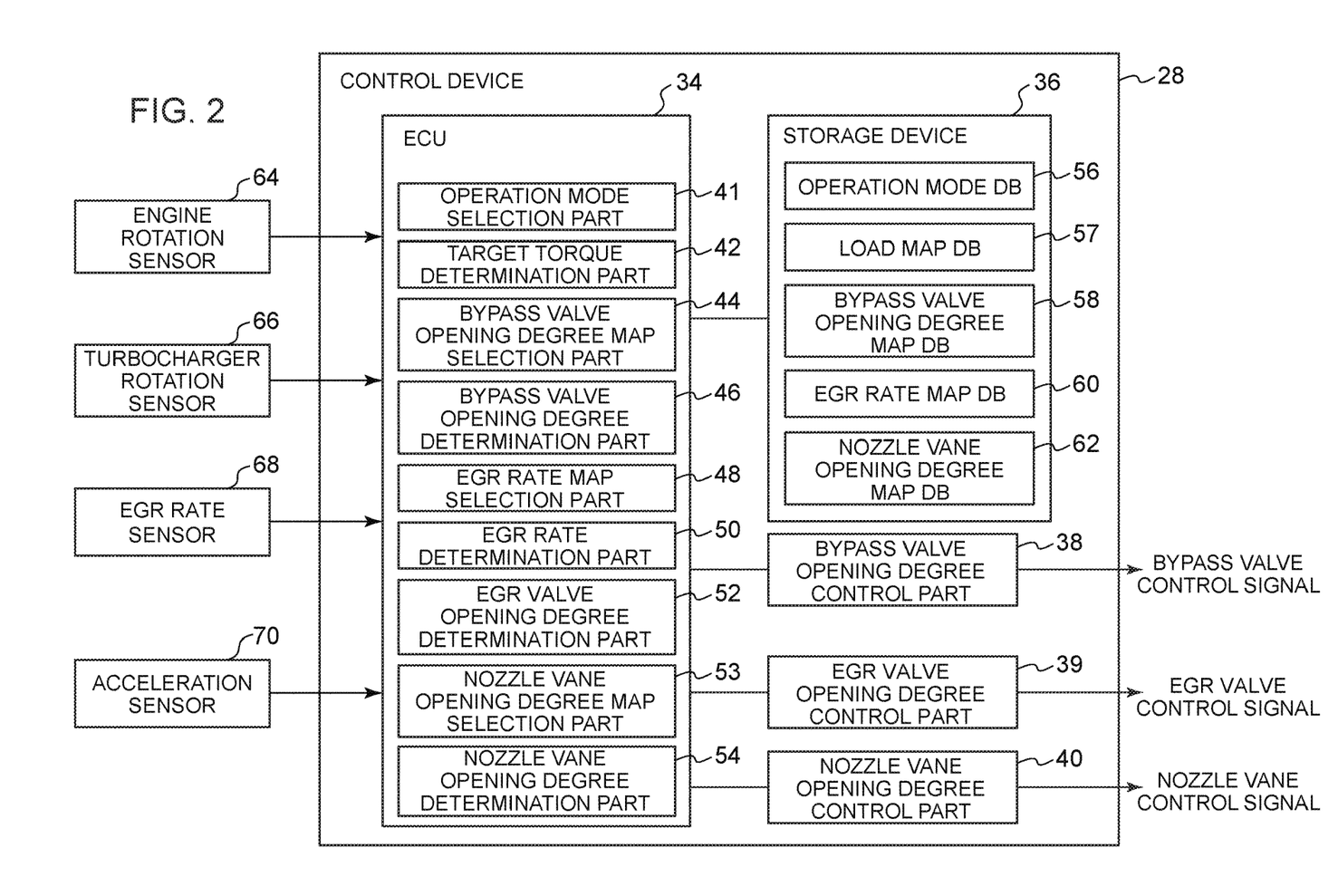
FIG. 2 is a schematic diagram for describing a configuration of a control device according to an embodiment.
Figure 3:
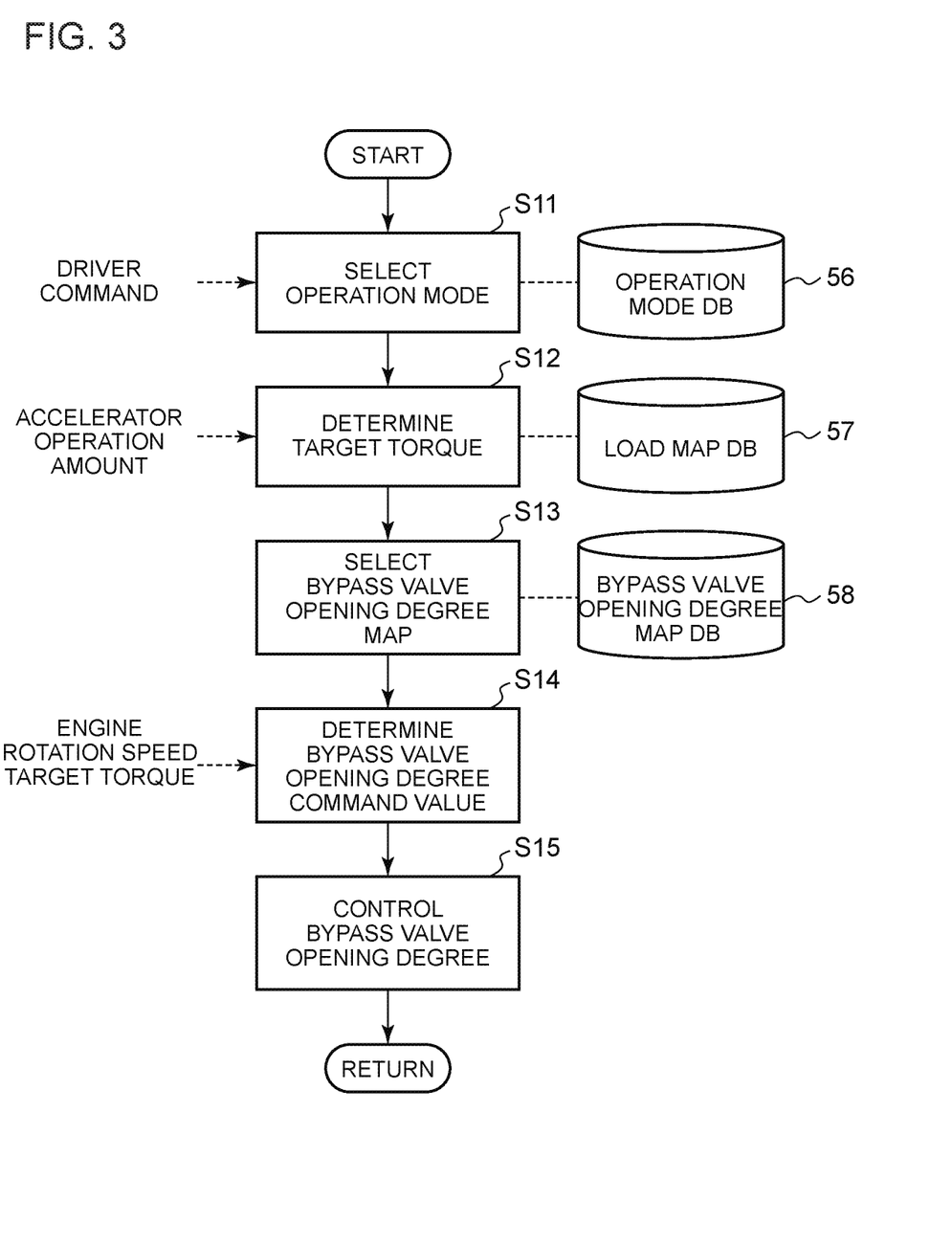
FIG. 3 is a diagram showing an example of an opening-degree control flow of a bypass valve 14.
Figure 5:
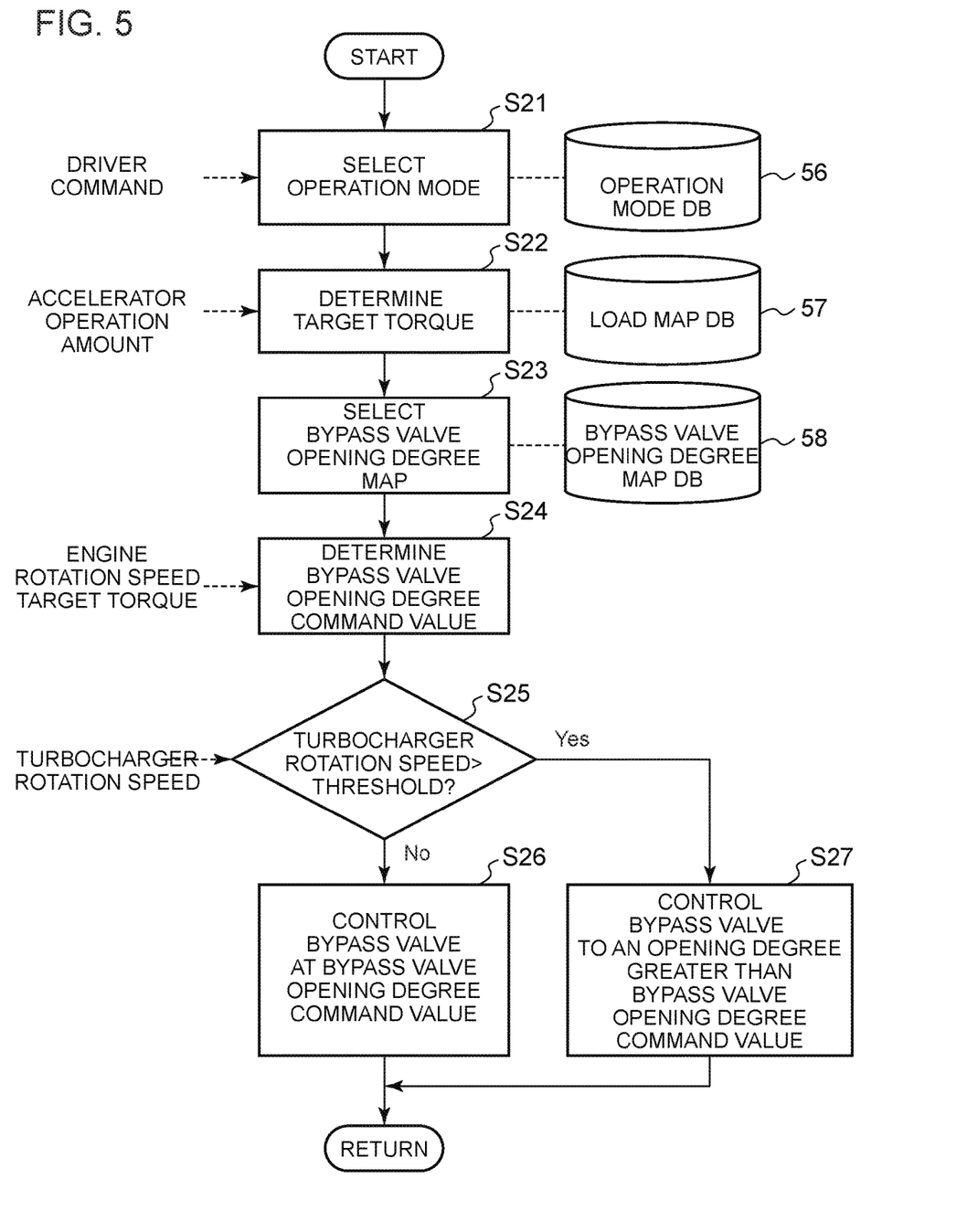
FIG. 5 is a diagram showing another example of an opening-degree control flow of the bypass valve 14.
Figure 6:
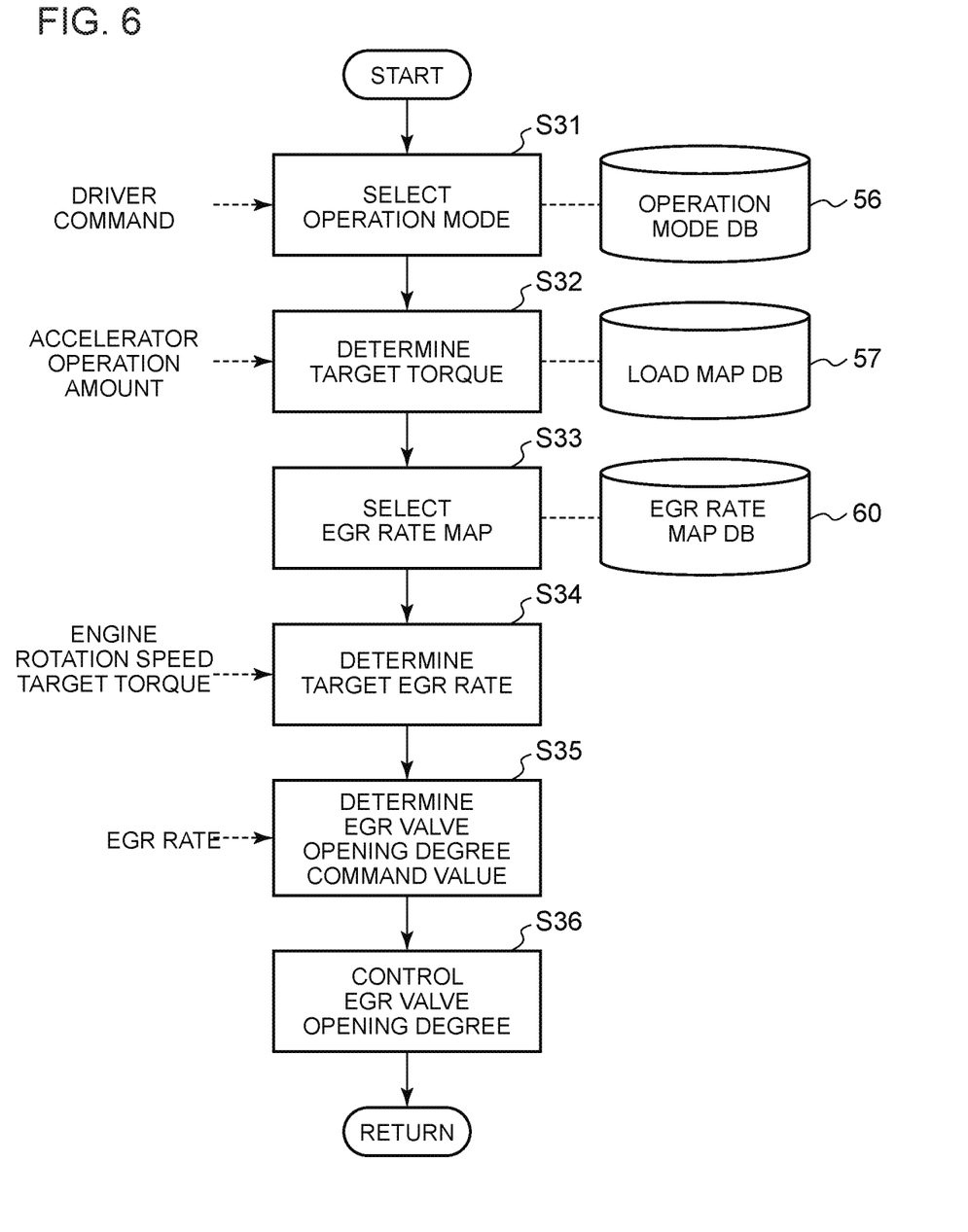
FIG. 6 is a diagram showing an example of an opening-degree control flow of an EGR valve 26.
Figure 7:
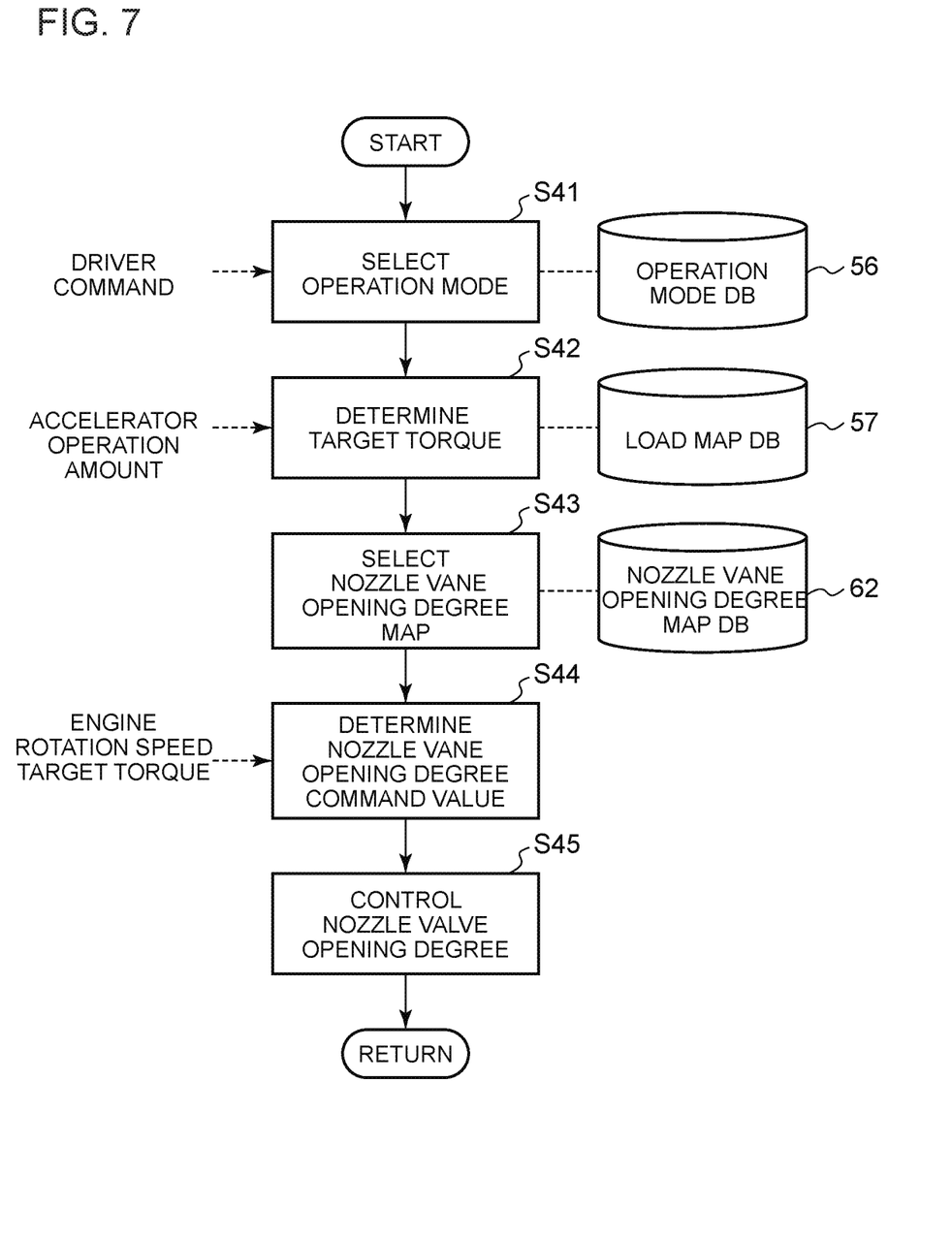
FIG. 7 is a diagram showing an example of an opening-degree control flow of a variable nozzle vane 31.

FIG. 2 is a schematic diagram for describing a configuration of a control device according to an embodiment. FIG. 3 is a diagram showing an example of an opening-degree control flow of a bypass valve 14. FIG. 5 is a diagram showing another example of an opening-degree control flow of the bypass valve 14. FIG. 6 is a diagram showing an example of an opening-degree control flow of an EGR 26. FIG. 7 is a diagram showing an example of an opening-degree control flow of a variable nozzle vane 31.

As shown in FIG. 2, the control device 28 includes an ECU 34, a storage device 36, a bypass valve opening degree control part 38, an EGR valve opening degree control part 39, and a nozzle vane opening degree control part 40.

As shown in FIG. 2, the ECU 34 includes a target torque determination part 42, an operation mode selection part 41, a bypass valve opening degree map selection part 44, a bypass valve opening degree determination part 46, an EGR rate map selection part 48, an EGR rate determination part 50, an EGR valve opening degree determination part 52, a nozzle vane opening degree map selection part 53, and a nozzle vane opening degree determination part 54. The storage device 36 includes an operation mode database (operation mode DB) 56, a load map database (load map DB) 57, a bypass valve opening degree map database (bypass valve opening degree DB) 58, an EGR valve opening degree map database (EGR valve opening degree map DB) 60, and a nozzle vane opening degree map database (nozzle vane opening degree map DB) 62.

The operation mode DB 56 stores a plurality of operation modes of the engine. The load map DB 57 stores a load map representing a relationship between the accelerator operation amount by the driver of the automobile (hereinafter, merely referred to as driver), and a target torque of the engine 2. The bypass valve opening degree map DB 58 stores a plurality of bypass valve opening degree maps representing respective relationships between the rotation speed of the engine 2 and the target torque of the engine 2 and the opening degree of the bypass valve 14 (relationships between a plurality of control parameters of the engine 2 and the opening degree of the bypass valve 14), respectively. The EGR valve opening degree map DB 60 stores a plurality of EGR rate maps representing respective relationships between the rotation speed of the engine 2 and the target torque of the engine 2 and the target EGR rate (relationships between a plurality of control parameters of the engine 2 and the target EGR rate), respectively. The nozzle vane opening degree map database (nozzle vane opening degree map DB) 62 stores a plurality of nozzle vane opening degree maps representing respective relationships between the rotation speed of the engine 2 and the target torque of the engine 2 and the opening degree of the variable nozzle vane 31 (relationships between a plurality of control parameters of the engine 2 and the opening degree of the bypass valve 14). The target torque of the engine 2 in each map may be substituted by a throttle opening degree or a fuel injection amount.

Herein, with reference to FIGS. 2 and 3, an example of an opening degree control flow of the bypass valve 14 will be described.

Firstly, in S11 of FIG. 3, from the plurality of operation modes of the engine 2 stored in the operation mode DB 56, the operation mode selection part 41 selects an operation mode on the basis of an instruction of the driver. Further, the operation mode selection part 41 may be configured to automatically select an operation mode on the basis of a measurement result of the acceleration sensor 70, for instance.

Next, in S12, the target torque determination part 42 determines a target torque for the engine 2, on the basis of the load map representing a relationship between the accelerator operation amount by the driver and the target torque of the engine 2 stored in the load map DB 57, and the accelerator operation amount by the driver measured by the acceleration sensor 70. S12 may be performed before, or simultaneously with S11.

In S13, from the plurality of bypass valve opening degree maps representing respective relationships between the rotation speed of the engine 2 and the target torque of the engine 2 and the opening degree of the bypass valve 14, the bypass valve opening degree map selection part 44 selects a bypass valve opening degree map in accordance with the operation mode selected by the operation mode selection part 41.

In S14, the bypass valve opening degree determination part 46 determines the opening degree command value for the bypass valve 14, on the basis of the bypass valve opening degree map related to the bypass valve 14 selected by the bypass valve opening degree map selection part 44, the rotation speed of the engine 2 measured by the engine rotation sensor 64, and the target torque of the engine 2 determined by the target torque determination part 42.

In S15, the bypass valve opening degree control part 38 controls the opening degree of the bypass valve 14 via an actuator (not shown), on the basis of the opening degree command value of the bypass valve 14 determined by the bypass valve opening degree determination part 46.

According to the above control flow, by preparing in advance the bypass valve opening degree map representing respective relationships between the rotation speed of the engine 2 and the target torque of the engine 2 and the opening degree of the bypass valve 14 for achieving a desired supercharging performance on the basis of simulation or engine tests, for instance, it is possible to achieve a desired supercharging performance suitable for an operation mode, by selecting a bypass valve opening degree map suitable for the operation mode.

Figure 4:
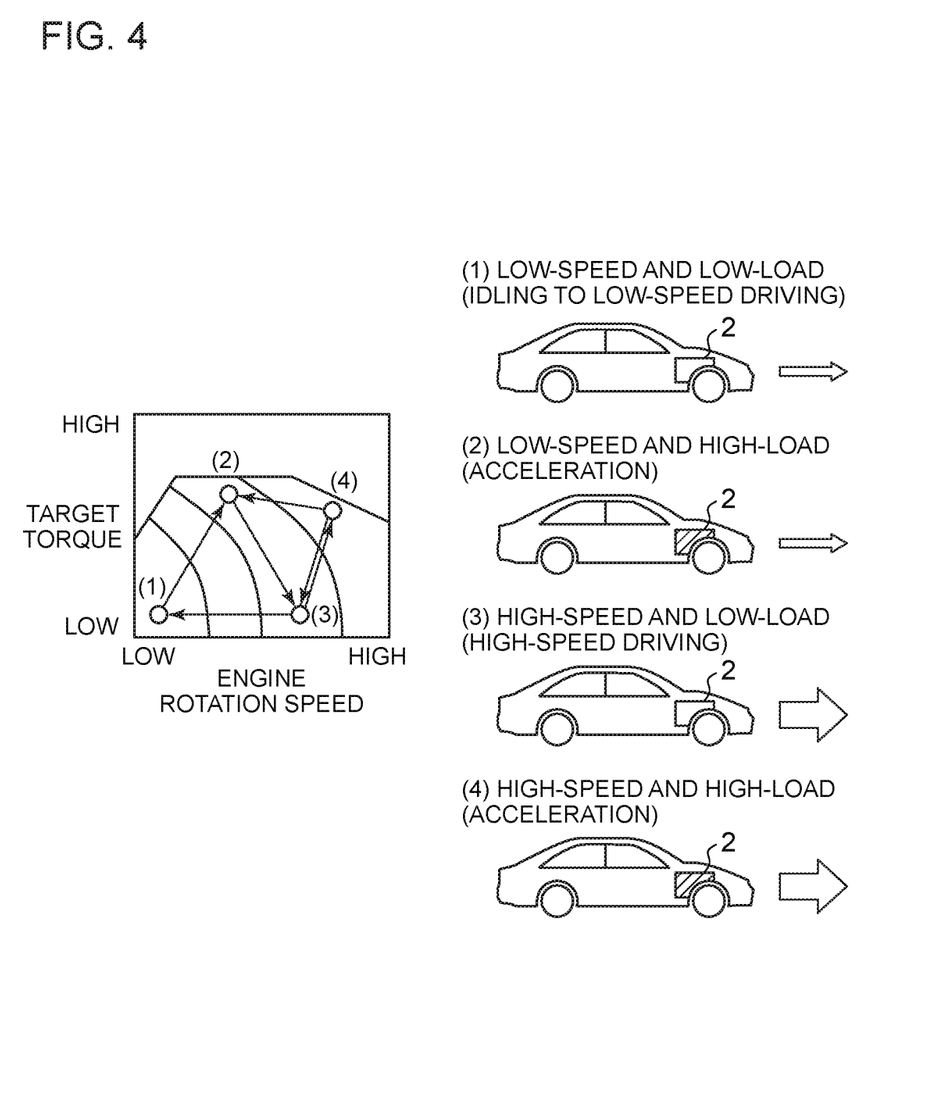
FIG. 4 is a schematic diagram for describing movement of an operation point on the bypass valve map.

For instance, to accelerate an automobile, as shown in FIG. 4, the opening degree of the bypass valve 14 is controlled by moving the points on the map in the order of "(1) low-speed and low-load (idling to low-speed driving)", "(2) low-speed and high-load" and "(3) high-speed and low-load", on the bypass valve opening degree map having two axes: the rotation speed of the engine 2 and the target torque of the engine 2.

Further, when accelerating or decelerating on a highway, for instance, the point on the bypass valve opening degree map may move from "(3) high-speed and low-load" to "(4) high-speed and high-load", or from "(4) high-speed and high-load" to "(3) high-speed and low-load". Furthermore, when entering a high-speed climbing section, for instance, the point on the bypass valve opening degree map may move from "(4) high-speed and high-load" to "(2) low-speed and low-load". As described above, the map enables an integrated control, for any situation where the automobile is accelerated or decelerated.

Furthermore, it is possible to achieve the above desired supercharging performance with a simplified configuration, by preparing the bypass valve opening degree map and determining the bypass valve opening degree with the bypass valve opening degree determination part 46 by using the control parameters that are normally measured from the engine 2 (in the above example, the rotation speed and the target torque of the engine 2). For instance, it is possible to achieve a desired supercharging performance without providing a pressure sensor, unlike Patent Documents 1 and 2, and it is possible to reduce the cost and avoid the risk of failure of a pressure sensor. Alternatively, by providing a pressure sensor in the intake passage 4 or the exhaust passage 6 to take into account the measurement result of the pressure sensor when determining the opening degree of the bypass valve 14, it is possible to achieve a desired supercharging performance with a pressure sensor that is simpler than those in Patent Documents 1 and 2, or to achieve a higher supercharging performance with a pressure sensor of an equivalent performance compared to those in Patent Documents 1 and 2.

In an embodiment, a plurality of operation modes stored in the operation mode DB 56 includes a low EGR operation mode, and a high EGR operation mode in which the EGR rate is greater than that in the low EGR operation mode.

Further, the plurality of bypass valve opening degree maps stored in the bypass valve opening degree map DB 58 include a low EGR map corresponding to the low EGR operation mode and a high EGR map corresponding to the high EGR operation mode. Furthermore, the bypass valve opening degree map selection part 44 is configured to select the low EGR map from the plurality of bypass valve opening degree maps stored in the bypass valve opening degree map DB 58 if the operation mode selection part 41 selects the low EGR operation mode, and select the high EGR map from the plurality of bypass valve opening degree maps stored in the bypass valve opening degree map DB 58 if the operation mode selection part 41 selects the high EGR operation mode.

With the above configuration, the bypass valve opening degree map selection part 44 selects a bypass valve opening degree map suitable for a low EGR rate if the low EGR operation mode is selected, and selects a bypass valve opening degree map suitable for a high EGR rate if the high EGR operation mode is selected. Accordingly, even if the EGR rate changes, it is possible to achieve a desired supercharging performance with a simple configuration.

In an embodiment, the plurality of operation modes stored in the operation mode DB 56 include an exhaust gas purification mode in which purification of exhaust gas is prioritized, an eco operation mode in which fuel consumption of the engine 2 is prioritized, and an acceleration focused mode in which the output of the engine 2 is prioritized. Further, the plurality of bypass valve opening degree maps stored in the bypass valve opening degree map DB 58 include an EGR priority map which prioritizes the EGR rate, a fuel consumption priority map which prioritizes the fuel consumption of the engine 2, and an output priority map which prioritizes the output of the engine 2. Furthermore, the bypass valve opening degree map selection part 44 is configured to select the EGR priority map from the plurality of bypass valve opening degree maps if the operation mode selection part 41 selects the exhaust gas purification operation mode, select the fuel consumption priority map from the plurality of bypass valve opening degree maps if the operation mode selection part 41 selects the eco operation mode, and select the output priority map from the plurality of bypass valve opening degree maps if the operation mode selection part 41 selects the acceleration focused mode.

With this configuration, if the exhaust gas purification mode in which purification of exhaust gas is prioritized is selected, the opening degree of the bypass valve 14 is controlled by using the EGR priority map in which the EGR rate is prioritized, and thus it is possible to achieve a desired supercharging performance with a reduced generation amount of NOx. Furthermore, if the eco operation mode is selected, the opening degree of the bypass valve 14 is controlled by using the fuel consumption priority map in which fuel consumption of the engine is prioritized, and thus it is possible to achieve a desired supercharging performance with a prioritized fuel consumption of the engine 2. Furthermore, if the acceleration focused mode is selected, the opening degree of the bypass valve 14 is controlled by using the output priority map in which the output of the engine 2 is prioritized, and thus it is possible to achieve a desired supercharging performance with a prioritized output of the engine 2.

In an embodiment, as shown in FIG. 5, the control device 28 may have a function to suppress the rotation speed of the turbocharger 30.

In the control flow shown in FIG. 5, steps S21 to S24 are similar to S11 to S14 shown in FIG. 3, and thus not described again. In S25, it is determined whether the rotation speed of the turbocharger 30 measured by the turbocharger rotation sensor 66 exceeds a threshold (e.g. a value of approximately 'design limit×0.9'). If it is determined that the rotation speed of the turbocharger 30 measured by the turbocharger rotation sensor 66 does not exceed the threshold in S25, in S26, the bypass valve opening degree control part 38 controls the bypass valve 14 at an opening degree command value of the bypass valve 14 determined by the bypass valve opening degree determination part 46 (opening degree command value obtained from the bypass valve opening degree map selected by the bypass valve opening degree map selection part 44).

If it is determined that the rotation speed of the turbocharger 30 measured by the turbocharger rotation sensor 66 exceeds the threshold in S25, in S27, the bypass valve opening degree control part 38 controls the bypass valve 14 so that the opening degree of the bypass valve 14 becomes greater than an opening degree command value for the bypass valve 14 determined by the bypass valve opening degree determination part 46 (opening degree command value obtained from the bypass valve opening degree map selected by the bypass valve opening degree map selection part 44). In this case, the bypass valve opening degree control part 38 may add a predetermined fixed value to the opening degree command value obtained from the bypass valve opening degree map to control the bypass valve 14, or may continue increasing the opening degree of the bypass valve 14 until the rotation speed of the turbocharger 30 becomes smaller than the threshold.

In the configuration where the opening degree of the bypass valve 14 is controlled on the basis of the bypass valve opening degree map created on the basis of simulation or engine tests, if the conditions in the simulation or the engine tests are considerably different from actual operational conditions of the engine 2, the rotation speed of the turbocharger 30 may exceed the design limit temporarily unless some measure is taken.

In this regard, according to the control flow shown in FIG. 5, if the rotation speed of the turbocharger 30 bypassed by the bypass passage 10 exceeds the threshold, the bypass valve 14 is controlled so that the opening degree of the bypass valve 14 becomes greater than the opening degree command value for the bypass valve 14 obtained from the bypass valve opening degree map, and thereby it is possible to suppress an excessive increase in the rotation speed of the turbocharger 30. Accordingly, it is possible to suppress breakage of the turbocharger 30.

Next, with reference to FIGS. 2 and 6, an example of an opening degree control flow of the EGR valve 26 will be described.

In the control flow shown in FIG. 6, steps S31 and S32 are similar to S11 and S12 shown in FIG. 3, and thus not described again.

In S33, from the plurality of EGR rate maps representing respective relationships between the rotation speed of the engine 2 and the target torque of the engine 2 and the target EGR rate, the EGR rate map selection part 48 selects an EGR rate map in accordance with the operation mode selected by the operation mode selection part 41.

In S34, the EGR rate determination part 50 determines the target EGR rate, on the basis of the EGR rate map selected by the EGR rate map selection part 48, the rotation speed of the engine 2 measured by the engine rotation sensor 64, and the target torque of the engine 2 determined by the target torque determination part 42.

In S35, the EGR valve opening degree determination part 52 determines the opening degree command value for the EGR valve 26 so as to bring the EGR rate closer to the target EGR rate, on the basis of a difference between the target EGR rate determined by the EGR rate determination part 50 and the EGR rate measured by the EGR rate sensor 68.

In S36, the EGR valve opening degree control part 39 controls the opening degree of the EGR valve 14 via an actuator (not shown), on the basis of the opening degree command value for the EGR valve 14 determined by the EGR valve opening degree determination part 52.

According to the above control flow, by preparing in advance the EGR valve opening degree map representing respective relationships between the rotation speed of the engine 2 and the target torque of the engine 2 and the target EGR rate for achieving a desired supercharging performance on the basis of simulation or engine tests for each operation point of the engine 2, for instance, it is possible to achieve a desired supercharging performance suitable for an operation mode, by selecting an EGR valve opening degree map suitable for the operation mode.

Furthermore, it is possible to achieve the above desired supercharging performance with a simplified configuration, by preparing the EGR valve opening degree map and determining the EGR valve opening degree with the EGR valve opening degree determination part 52 by using the control parameters that are normally measured from the engine 2 (in the above example, the rotation speed and the target torque of the engine).

Next, with reference to FIGS. 2 and 7, an example of an opening degree control flow of the variable nozzle vane 31 will be described.

In the control flow shown in FIG. 7, steps S41 and S42 are similar to S11 and S12 shown in FIG. 3, and thus not described again.

In S43, from the plurality of nozzle vane opening degree maps representing respective relationships between the rotation speed of the engine 2 and the target torque of the engine 2 and the opening degree of the variable nozzle vane 31, the nozzle vane opening degree map selection part 53 selects a nozzle vane opening degree map in accordance with the operation mode selected by the operation mode selection part 41.

In S44, the nozzle vane opening degree determination part 54 determines the opening degree command value for the variable nozzle vane 31, on the basis of the nozzle vane opening degree map selected by the nozzle vane opening degree map selection part 53, the rotation speed of the engine 2 measured by the engine rotation sensor 64, and the target torque of the engine 2 determined by the target torque determination part 42.

In S45, the nozzle vane opening degree control part 40 controls the opening degree of the variable nozzle vane 31 via an actuator (not shown), on the basis of the opening degree command value for the variable nozzle vane 31 determined by the nozzle vane opening degree determination part 54.

According to the above control flow, by preparing in advance the nozzle vane opening degree map representing respective relationships between a plurality of control parameters at each operation point of the engine 2 (in the above example, the rotation speed and the target torque of the engine) and the opening degree of the variable nozzle vane 31 for achieving a desired supercharging performance on the basis of simulation or engine tests, for instance, it is possible to achieve a desired supercharging performance suitable for an operation mode, by selecting a nozzle vane opening degree map suitable for the operation mode. In an embodiment, the nozzle vane opening degree map, the bypass valve opening degree map, and the EGR rate map are obtained by mapping optimum bypass valve opening degrees, optimum EGR valve opening degrees, and optimum nozzle vane opening degrees while changing the respective opening degrees of the bypass valve 14, the EGR valve 26, and the variable nozzle vane 31 in simulation or the like.

Furthermore, according to the above flow, it is possible to achieve the above desired supercharging performance with a simplified configuration, by preparing the nozzle vane opening degree map and determining the nozzle vane opening degree with the nozzle vane opening degree determination part 54 by using the control parameters that are normally measured from the engine (in the above example, the rotation speed and the target torque of the engine 2).

Embodiments of the present invention were described in detail above, but the present invention is not limited thereto, and various amendments and modifications may be implemented.

Figure 8:
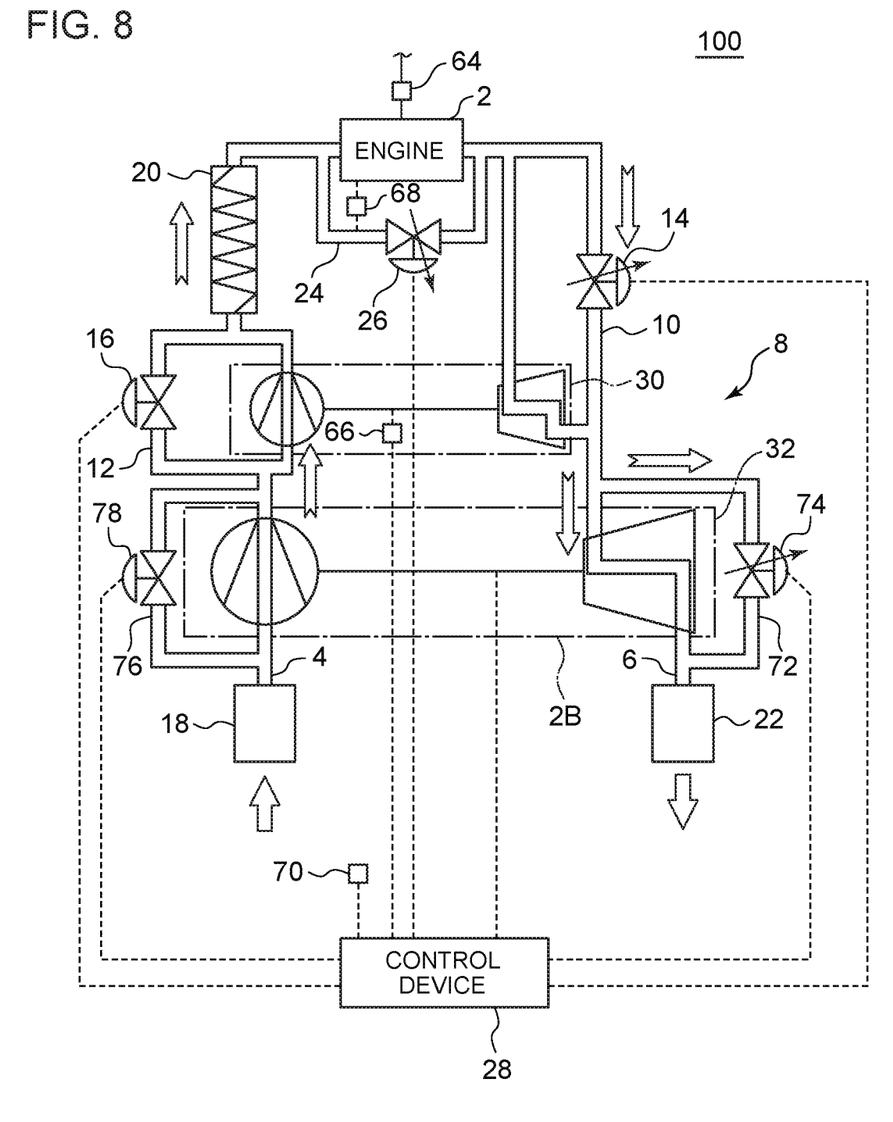
FIG. 8 is a schematic diagram of another configuration example of a multi-stage supercharging system 100.

For instance, in the above described embodiment, the opening degree control is for the bypass valve 14 disposed in the bypass passage 10 bypassing the turbine side of the turbocharger 30. Nevertheless, the present invention may be applied similarly to the opening degree control for the bypass valve 16 disposed in the bypass passage 12 bypassing the compressor side of the turbocharger 30. Further, as shown in FIG. 8, if the bypass passage 72 bypassing the turbocharger 32 is disposed in the exhaust passage 6, the present invention may be also applied similarly to the opening degree control for the bypass valve 74 disposed in the bypass passage 72. Further, as shown in FIG. 8, if the bypass passage 76 bypassing the turbocharger 32 is disposed in the intake passage 4, the present invention may be also applied similarly to the opening degree control for the bypass valve 78 disposed in the bypass passage 76. In these cases, the bypass vale opening degree map may be created for each bypass valve in advance on the basis of simulation or engine tests, for instance, to be used in the above described controls.

Further, in the above embodiment, shown as an example of bypass valve opening degree map is a map representing relationships between the rotation speed of the engine 2 and the target torque of the engine 2 and the opening degree of the bypass valve 14. Nevertheless, the bypass valve opening degree map is not limited to this. It is sufficient if the map represents relationships between a plurality of control parameters of the engine 2 (besides the rotation speed and torque described above, load, EGR rate, or opening degree of the EGR valve 26, for example), and the opening degree of the bypass valve. Furthermore, similarly, it is sufficient if the EGR rate map is a map representing relationships between a plurality of control parameters of the engine 2 (besides the rotation speed and torque described above, load. EGR rate, or opening degree of the EGR valve 26, for example), and the target EGR rate. Further, it is sufficient if the nozzle vane opening degree map is a map representing relationships between a plurality of control parameters of the engine 2 (besides the rotation speed and torque described above, load, EGR rate, or opening degree of the EGR valve 26, for example), and the nozzle vane opening degree.

Further, in the above embodiment, the bypass valve opening degree map selection part 44 selects a bypass valve opening degree map from the bypass valve opening degree map DB 58. Nevertheless, the bypass valve opening degree map selection part 44 may select a plurality of bypass valve opening degree maps from the bypass valve opening degree map DB 58, and it is sufficient if at least one bypass valve opening degree map is selected. Similarly, it is sufficient if the EGR rate map selection part 48 selects at least one bypass opening degree map, and it is sufficient if the nozzle vane opening degree map selection part selects at least one nozzle vane opening degree map.

Furthermore, in FIG. 1, a high-pressure EGR is shown as an example, in which the EGR passage 24 is connected to the inlet side of the engine 2 (between the turbocharger 30 and the engine 2 in the intake passage 4). Nevertheless, the present invention can be also applied to a configuration having a low-pressure EGR in which the EGR passage 24 is connected to the compressor inlet side of the turbocharger 30 (between the turbocharger 30 and the turbocharger 32 in the intake passage 4).

DESCRIPTION OF REFERENCE NUMERALS

2 Engine
4 Intake passage
6 Exhaust passage
8, 30, 32 Turbocharger
10, 12, 72, 76 Bypass passage
14, 16, 74, 78 Bypass valve
18 Air cleaner
20 Inter cooler
22 Muffler
24 EGR passage
26 EGR valve
28 Control device
31 Variable nozzle vane
36 Storage device
38 Bypass valve opening degree control part
39 EGR valve opening degree control part
40 Nozzle vane opening degree control part
41 Operation mode selection part
42 Target torque determination part
44 Bypass valve opening degree map selection part
46 Bypass valve opening degree determination part
48 EGR rate map selection part
50 EGR rate determination part
52 EGR valve opening degree determination part
53 Nozzle vane opening degree map selection part
54 Nozzle vane opening degree determination part
56 Operation mode DB
57 Load map DB
58 Bypass valve opening degree map DB
60 EGR rate map DB
62 Nozzle vane opening degree map DB
64 Engine rotation sensor
66 Turbocharger rotation sensor
68 EGR rate sensor
70 Acceleration sensor
100 Multi-stage turbo supercharging system

The invention claimed is:

1. A multi-stage turbo supercharging system including a plurality of turbochargers to be driven by exhaust gas of an engine, comprising:
 a bypass passage which bypasses a turbocharger from among the plurality of turbochargers, in an intake passage or an exhaust passage of the engine;
 a bypass valve disposed in the bypass passage;

an operation mode selection part configured to select an operation mode from among a plurality of operation modes of the engine;

a bypass valve opening degree map selection part configured to select at least one bypass valve opening degree map in accordance with the operation mode selected by the operation mode selection part, from among a plurality of bypass valve opening degree maps which represent respective relationships between a plurality of control parameters of the engine and an opening degree of the bypass valve;

a bypass valve opening degree determination part configured to determine an opening degree command value for the bypass valve on the basis of the bypass valve opening degree map selected by the bypass valve opening degree map selection part and control parameter information representing the plurality of control parameters; and a bypass valve opening degree control part configured to control the opening degree of the bypass valve on the basis of the opening degree command value for the bypass valve determined by the bypass valve opening degree determination part; and an EGR passage which brings the exhaust passage and the intake passage into communication; and an EGR valve disposed in the EGR passage, wherein the plurality of operation modes include:
a low EGR operation mode; and
a high EGR operation mode in which an EGR rate representing a ratio of a recirculation flow rate of the exhaust gas to the intake passage via the EGR passage to an intake amount of the engine is greater than that in the low EGR operation mode, wherein the plurality of bypass valve opening degree maps include a low EGR map corresponding to the low EGR operation mode and a high EGR map corresponding to the high EGR operation mode, and wherein the bypass valve opening degree map selection part is configured to select the low EGR map from the plurality of bypass valve opening degree maps if the low EGR operation mode is selected by the operation mode selection part and select the high EGR map from the plurality of bypass valve opening degree maps if the high EGR operation mode is selected by the operation mode selection part.

2. The multi-stage turbo supercharging system according to claim 1, further comprising:
wherein the plurality of operation modes include an exhaust gas purification mode which prioritizes purification of the exhaust gas over fuel consumption of the engine and an output of the engine, wherein the plurality of bypass valve opening degree maps include an EGR priority map which prioritizes an EGR rate representing a ratio of a recirculation flow rate of the exhaust gas to the intake passage via the EGR passage to an intake amount of the engine, and wherein the bypass valve opening degree map selection part is configured to select the EGR priority map from among the plurality of bypass valve opening degree maps if the exhaust gas purification mode is selected by the operation mode selection part.

3. The multi-stage turbo supercharging system according to claim 1,
wherein the plurality of operation modes include an eco operation mode and an acceleration focused mode,
wherein the plurality of bypass valve opening degree maps include a fuel consumption priority map which prioritizes fuel consumption of the engine over purification of the exhaust gas and an output of the engine, and an output priority map which prioritizes the output of the engine over purification of the exhaust gas and fuel consumption of the engine, and wherein the bypass valve opening degree map selection part is configured to select the fuel consumption priority map from the plurality of bypass valve opening degree maps if the eco operation mode is selected by the operation mode selection part and select the output priority map from the plurality of bypass valve opening degree maps if the acceleration focused mode is obtained by the operation mode selection part.

4. The multi-stage turbo supercharging system according to claim 1, further comprising:
an EGR rate sensor for measuring an EGR rate representing a ratio of a recirculation flow rate of the exhaust gas to the intake passage via the EGR passage to an intake amount of the engine;

an EGR rate map selection part configured to select at least one EGR rate map in accordance with the operation mode selected by the operation mode selection part from among a plurality of EGR rate maps representing respective relationships between the plurality of control parameters of the engine and a target EGR rate;

an EGR rate determination part configured to determine the target EGR rate on the basis of the EGR rate map selected by the EGR rate map selection part and control parameter information representing the plurality of control parameters;

an EGR valve opening degree determination part configured to determine an opening degree command value for the EGR valve on the basis of the EGR rate measured by the EGR rate sensor and the target EGR rate determined by the EGR rate determination part; and an EGR valve opening degree control part configured to control an opening degree of the EGR valve on the basis of the opening degree command value for the EGR valve determined by the EGR valve opening degree determination part.

5. The multi-stage turbo supercharging system according to claim 1,
wherein the engine is an engine for an automobile,
wherein the plurality of control parameters include a target torque of the engine, and
wherein the multi-stage turbo supercharging system includes a target torque determination part configured to determine the target torque on the basis of an accelerator operation amount by a driver.

6. The multi-stage turbo supercharging system according to claim 1, further comprising a rotation sensor configured to measure a rotation speed of a turbocharger bypassed by the bypass passage, of the plurality of turbochargers,
wherein the bypass valve opening degree control part is configured to control the bypass valve so that the opening degree of the bypass valve becomes greater than the opening degree command value for the bypass valve obtained from the bypass valve opening degree map selected by the bypass valve opening degree map selection part, if the rotation speed of the turbocharger measured by the rotation sensor exceeds a threshold.

7. The multi-stage turbo supercharging system according to claim 1, wherein the plurality of turbochargers include a variable geometry turbocharger including a variable nozzle vane for adjusting a flow velocity of exhaust gas to a turbine blade, and wherein the multi-stage turbo supercharging system includes:
- a nozzle vane opening degree map selection part configured to select at least one nozzle vane opening degree map in accordance with the operation mode selected by the operation mode selection part, from among a plurality of nozzle vane opening degree maps representing respective relationships between the plurality of control parameters of the engine and a rotation speed of the engine;
- a nozzle vane opening degree determination part configured to determine an opening degree command value for the variable nozzle vane on the basis of the nozzle vane opening degree map selected by the nozzle vane opening degree map selection part and control parameter information representing the plurality of control parameters; and
- a nozzle vane opening degree control part configured to control the opening degree of the variable nozzle vane on the basis of the opening degree command value for the variable nozzle vane determined by the nozzle vane opening degree determination part.

8. A control device for a multi-stage turbo supercharging system, wherein the multi-stage turbo supercharging system comprises:
- a plurality of turbochargers to be driven by exhaust gas of an engine;
- a bypass passage which bypasses a turbocharger from among the plurality of turbochargers, in an intake passage or an exhaust passage of the engine;
- a bypass valve disposed in the bypass passages;
- an EGR passage which brings the exhaust passage and the intake passage into communication; and
- an EGR valve disposed in the EGR passage,
  the control device comprising:
  - an operation mode selection part configured to select an operation mode from among a plurality of operation modes of the engine;
  - a bypass valve opening degree map selection part configured to select at least one bypass valve opening degree map in accordance with the operation mode selected by the operation mode selection part, from among a plurality of bypass valve opening degree maps which represent respective relationships between a plurality of control parameters of the engine and a rotation speed of the engine;
  - a bypass valve opening degree determination part configured to determine an opening degree command value for the bypass valve on the basis of the bypass valve opening degree map selected by the bypass valve opening degree map selection part and control parameter information representing the plurality of control parameters; and
  - a bypass valve opening degree control part configured to control the opening degree of the bypass valve on the basis of the opening degree command value for the bypass valve determined by the bypass valve opening degree determination part, wherein the plurality of operation modes include:
- a low EGR operation mode; and
- a high EGR operation mode in which an EGR rate representing a ratio of a recirculation flow rate of the exhaust gas to the intake passage via the EGR passage to an intake amount of the engine is greater than that in the low EGR operation mode, wherein the plurality of bypass valve opening degree maps include a low EGR map corresponding to the low EGR operation mode and a high EGR map corresponding to the high EGR operation mode, and wherein the bypass valve opening degree map selection part is configured to select the low EGR map from the plurality of bypass valve opening degree maps if the low EGR operation mode is selected by the operation mode selection part and select the high EGR map from the plurality of bypass valve opening degree maps if the high EGR operation mode is selected by the operation mode selection part.

9. An operation control program for a multi-stage turbo supercharging system comprising a plurality of turbochargers to be driven by exhaust gas of an engine; a bypass passage which bypasses a turbocharger from among the plurality of turbochargers, in an intake passage or an exhaust passage of the engine; and a bypass valve disposed in the bypass passage, the operation control program being configured to cause a computer to:
- select an operation mode from among a plurality of operation modes of the engine;
- select at least one bypass valve opening degree map in accordance with the operation mode, from among a plurality of bypass valve opening degree maps which represent respective relationships between a plurality of control parameters of the engine and an opening degree of the bypass valve;
- determine an opening degree command value for the bypass valve on the basis of the bypass valve opening degree map and control parameter information representing the plurality of control parameters; and
- control the opening degree of the bypass valve on the basis of the opening degree command value for the bypass valve, wherein the plurality of operation modes include;
- a low EGR operation mode; and
- a high EGR operation mode in which an EGR rate representing a ratio of a recirculation flow rate of the exhaust gas to the intake passage via the EGR passage to an intake amount of the engine is greater than that in the low EGR operation mode, wherein the plurality of bypass valve opening degree maps include a low EGR map corresponding to the low EGR operation mode and a high EGR map corresponding to the high EGR operation mode, and wherein the bypass valve opening degree map selection part is configured to select the low EGR map from the plurality of bypass valve opening degree maps if the low EGR operation mode is selected by the operation mode selection part and select the high EGR map from the plurality of bypass valve opening degree maps if the high EGR operation mode is selected by the operation mode selection part.

* * * * *